(12) United States Patent
Wada et al.

(10) Patent No.: US 6,734,219 B2
(45) Date of Patent: May 11, 2004

(54) FLEXIBLE POLYURETHANE FOAM AND METHOD FOR ITS PRODUCTION

(75) Inventors: Hiroshi Wada, Kashima-gun (JP); Katsuji Kuribayashi, Kashima-gun (JP); Takayuki Sasaki, Kashima-gun (JP); Yuuji Kimura, Kashima-gun (JP); Hisakazu Harada, Kashima-gun (JP); Etsuko Akagi, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/304,969

(22) Filed: Nov. 27, 2002

(65) Prior Publication Data

US 2003/0109594 A1 Jun. 12, 2003

(30) Foreign Application Priority Data

Nov. 30, 2001 (JP) ........................................ 2001-367186

(51) Int. Cl.[7] .............................................. C08G 18/28
(52) U.S. Cl. ...................... 521/170; 521/112; 521/137; 521/174
(58) Field of Search ................................ 521/112, 137, 521/170, 174

(56) References Cited

U.S. PATENT DOCUMENTS

| | | |
|---|---|---|
| 4,722,946 A * | 2/1988 | Hostettler .................. 521/158 |
| 5,093,380 A | 3/1992 | Takeyasu et al. |
| 5,100,922 A | 3/1992 | Wada et al. |
| 5,437,822 A | 8/1995 | Wada et al. |
| 6,028,230 A | 2/2000 | Le-Khac et al. |
| 6,066,683 A | 5/2000 | Beisner et al. |
| 6,218,444 B1 * | 4/2001 | Hager et al. ................. 521/174 |
| 6,313,060 B1 | 11/2001 | Sugiyama et al. |

FOREIGN PATENT DOCUMENTS

| | | |
|---|---|---|
| EP | 0 677 543 | 10/1995 |
| EP | 0 776 922 | 6/1997 |
| EP | 0 916 686 | 5/1999 |
| EP | 1 022 300 | 7/2000 |
| JP | 46-27250 | 8/1971 |
| JP | 2-286707 | 11/1990 |
| JP | 4-145123 | 5/1992 |
| JP | 8-231676 | 9/1996 |

* cited by examiner

Primary Examiner—John M Cooney
(74) Attorney, Agent, or Firm—Oblon, Spivak, McClelland, Maier & Neustadt, P.C.

(57) ABSTRACT

A method for producing a flexible polyurethane foam in an open state, which comprises reacting a polyol with a polyisocyanate compound in the presence of a catalyst, a blowing agent and a foam stabilizer, wherein as the polyol, a polyol having a hydroxyl value of at most 15 mgKOH/g is used.

41 Claims, No Drawings

FLEXIBLE POLYURETHANE FOAM AND METHOD FOR ITS PRODUCTION

The present invention relates to a method for producing a flexible polyurethane foam using a polyol having a high molecular weight and a low hydroxyl value, and a flexible polyurethane foam thereby obtained.

Heretofore, a flexible polyurethane foam has been produced by using a polyol and by employing a production method of an open system such as a slab foaming method or a production method of a closed system employing a closed mold. The slab foam produced by the production method of an open system is produced usually by using a polyol having a molecular weight of from about 3,000 to 5,000, as the raw material polyol.

Usually, the polyol to be used as the raw material for a flexible polyurethane foam is produced by ring opening addition polymerization of an alkylene oxide such as propylene oxide using a polyhydric alcohol or the like as an initiator by means of a sodium type catalyst such as sodium hydroxide or a potassium type catalyst such as potassium hydroxide. By such a production method, a monool having an unsaturated bond (an unsaturated monool) will be formed as a by-product, and the amount of such an unsaturated monool to be formed, will increase as the hydroxyl value of the polyol decreases (as the molecular weight increases). If a flexible polyurethane foam is produced by using a polyol having a high unsaturation value, there will be a problem such as a decrease in hardness, a deterioration of the compression set or a decrease in curing during the molding. Further, if it is attempted to produce a polyol having a low hydroxyl value by means of a sodium type catalyst or a potassium type catalyst, the unsaturation value tends to be remarkably high, and the production tends to be very difficult. On the other hand, as a method for producing a polyol having a low hydroxyl value and a low unsaturation value, a method is known wherein an alkylene oxide is subjected to ring opening addition polymerization by means of a double metal cyanide complex catalyst.

If a double metal cyanide complex catalyst is used for the production, it is possible to produce a polyol having a low unsaturation value, but if a polyol having a high molecular weight such as one having a hydroxyl value of at most 15 mgKOH/g, is used as a raw material, the stability during the production of a foam tends to be low, and it has been considered difficult to produce a flexible polyurethane foam.

In order to overcome the above problem of moldability, a method has been proposed to produce a flexible polyurethane foam by using a polyol mixture comprising a polyol produced by means of a double metal cyanide complex catalyst and a polyol produced by means of a sodium hydroxide catalyst or a potassium hydroxide catalyst (JP-A-8-231676). However, such a proposal is concerned with a mold foamings, and no production examples is disclosed in which a high molecular weight polyol is employed. Here, in this invention, a word "moldability" means, foam stability on producing of a polyurethane flexible foam by a slab foaming method. Thus, when a moldability is good, it means that there is no occurring of collapse or shrinkage.

Further, a method is also proposed to produce a slab foam by using a polyol having a hydroxyl value of from 10 to 80 mgKOH/g produced by means of a double metal cyanide complex catalyst (U.S. Pat. Nos. 6,028,230 and 6,066,683). However, Examples in these references disclose only cases wherein flexible foams are produced by a polyol having a molecular weight of 5,000, and no Examples are given in which higher molecular weight polyols are used.

Further, a method is also proposed to produce a flexible polyurethane foam excellent in mechanical properties such as tensile strength and elongation by using a polyoxyalkylene diol having an average molecular weight of at least 1,500 and a polyoxyalkylene diol having an average molecular weight of from 150 to 350, as essential components (JP-A-2-286707). In this publication, an example is disclosed in which if the above two components are not included, particularly if a polyoxyalkylene diol having two functional groups is not used, the mechanical properties tend to be inadequate. Further, in that publication, there is no disclosure with respect to an example for producing a flexible polyurethane foam using a polyol having a molecular weight of at least 5,000.

The present invention proposes a method for producing a flexible polyurethane foam wherein a polyol having a high molecular weight and a low hydroxyl value is used as a raw material, whereby it has been considered difficult to produce a foam. Further, the present invention provides a flexible polyurethane foam excellent in mechanical properties by using a polyol having a high molecular weight.

The present invention is an invention relating to a method for producing a flexible foam having good moldability, by using, as a raw material, a high molecular weight polyol having a low hydroxyl value. By using a high molecular weight polyol as the raw material, the obtainable flexible polyurethane foam has a characteristic that the mechanical properties are good. Further, the flexible polyurethane foam obtainable by the present invention has a characteristic that the change in the physical properties by a temperature change is little. Further, by using a double metal cyanide complex catalyst, it is possible to produce a polyol having a low unsaturation value and a narrow molecular weight distribution. As compared with a polyol having a wide molecular weight distribution, the polyol having a narrow molecular weight distribution has a low viscosity, whereby the foam stability at the time of producing the flexible polyurethane foam will be improved.

Namely, the present invention provides a method for producing a flexible polyurethane foam in an open state, which comprises reacting a polyol with a polyisocyanate compound in the presence of a catalyst, a blowing agent and a foam stabilizer, wherein as the polyol, a polyol having a hydroxyl value of at most 15 mgKOH/g is used.

Further, the present invention provides a flexible polyurethane foam produced by the above production method.

Now, the present invention will be described in detail with reference to the preferred embodiments.

The present invention provides a method for producing a flexible polyurethane foam in an open state, which comprises reacting a polyol with a polyisocyanate compound in the presence of a catalyst, a blowing agent and a foam stabilizer, wherein as the polyol, a polyol having a hydroxyl value of at most 15 mgKOH/g is used. Namely, the present invention is characterized in that a flexible polyurethane foam (hereinafter referred to simply as a flexible foam) is produced by using, as a raw material, a polyol having a high molecular weight and a low hydroxyl value, which used to be considered hardly useful for the production of a foam. The flexible foam produced by using, as the raw material, a polyol having a high molecular weight and a low hydroxyl value, is preferred since the mechanical properties are good. Further, such a flexible foam is preferred, since the temperature sensitivity is low at a low temperature, and the characteristic of the foam under a normal temperature condition can be maintained even under a low temperature condition.

The hydroxyl value of the polyol to be used in the present invention is at most 15 mgKOH/g, preferably less than 10 mgKOH/g.

The polyol having a low hydroxyl value to be employed in the present invention, can be obtained by reacting an alkylene oxide to an initiator by ring opening polymerization by means of a suitable catalyst for synthesis of a polyol. As such a catalyst for synthesis of a polyol, a double metal cyanide complex catalyst, a cesium hydroxide catalyst or a phosphazenium compound catalyst may, for example, be mentioned. To produce a polyol having a low hydroxyl value, it is preferred to employ a double metal cyanide complex catalyst.

When such a double metal cyanide complex catalyst is used, it is possible to produce a polyol having a low hydroxyl value and a narrow molecular weight distribution. The polyol having a narrow molecular weight distribution has a low viscosity as compared with a polyol having a wide molecular weight distribution in a molecular weight region of the same level, whereby the foam stability at the time of producing a flexible foam, will be improved, such being desirable.

As such a double metal cyanide complex catalyst, one disclosed in JP-B-46-27250, may, for example, be used. As a specific example, a complex comprising zinc hexacyanocobaltate as the main component, may be mentioned, and its ether and/or alcohol complex is preferred.

As such an ether, ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME) is, for example, preferred. Further, as such an alcohol, tert-butyl alcohol is, for example, preferred.

As the above-mentioned alkylene oxide, ethylene oxide, propylene oxide, 1,2-epoxybutane or 2,3-epoxybutane may, for example, be mentioned. Propylene oxide or a combined use of ethylene oxide with propylene oxide, is preferred. It is particularly preferred to use at least 50 mass % of propylene oxide as an alkylene oxide at the time of producing the polyol (i.e. at least 50 mass % of a polyoxypropylene group in the polyoxyalkylene chain).

As the above-mentioned initiator, a compound in which the number of active hydrogen in the molecule is from 2 to 6, is preferred. For example, it may be a polyhydric alcohol such as ethylene glycol, propylene glycol, 1,4-butanediol, glycerol, trimethylolpropane, pentaerythritol, diglycerol, mesoerythritol, methylglucoside, glucose or sorbitol; a phenol such as bisphenol A; an amine such as ethylenediamine, diethylenetriamine, piperazine, aminoethylpiperazine, diaminodiphenylmethane or monoethanolamine; or a condensed compound such as a phenol resin or a novolak resin. Among the above initiators, a polyhydric alcohol is preferred. These initiators may be used in combination as a mixture of two or more of them, or they may be used in combination with an active hydrogen compound such as sucrose having at least 7 active hydrogen. Further, a compound having an alkylene oxide added by ring opening addition to the above compound, may be used as the initiator.

The polyol to be used in the present invention preferably contains an oxyethylene group in its molecule. As a method for introducing an oxyethylene group into the polyol, for example, ethylene oxide and an alkylene oxide having at least three carbon atoms, are sequentially or simultaneously addition-polymerized to the initiator. Particularly, as a method for producing a polyol having an oxyethylene group at the molecular terminal, a method may, for example, be mentioned wherein after the above polymerization, ethylene oxide is addition-polymerized.

The number of hydroxyl groups in the polyol is preferably from 2 to 8, more preferably from 2 to 6, particularly preferably from 2.8 to 5.2. Here, the number of hydroxyl groups means an average value of the number of active hydrogen in the initiator. When the number of hydroxyl groups is at least 2, the flexible foam will be soft, whereby a drawback that the compression set deteriorate, can be avoided. When the number of hydroxyl groups is at most 8, it is possible to avoid a drawback that the resulting flexible foam hardens, or the physical properties such as elongation deteriorate.

The hydroxyl value of the polyol is at most 15 mgKOH/g, more preferably less than 10 mgKOH/g. By using a polyol having a hydroxyl value of at most 15 mgKOH/g, it is possible to produce a flexible foam having characteristics such that it has excellent mechanical properties, and the change in the physical properties by a temperature change is little. Further, if the hydroxyl value is too low, the viscosity of the polyol becomes high, whereby the production of a flexible foam will be difficult. Namely, the hydroxyl value of the polyol is preferably at least 5 mgKOH/g.

The unsaturation value of the polyol to be used in the present invention is preferably at most 0.05 meq/g. When the unsaturation value is at most 0.05 meq/g, it is possible to avoid a drawback that the durability of the produced flexible foam deteriorates. More preferably, the unsaturation value of the polyol is at most 0.04 meq/g.

The polyol to be used in the present invention may contain fine polymer particles. A dispersion system having fine polymer particles stably dispersed in a base polyol, is called a polymer-dispersed polyol. As the fine polymer particles, fine particles of addition polymerization type polymer or polycondensation type polymer, may be employed. The addition polymerization type polymer may be obtained by polymerizing a monomer such as acrylonitrile, styrene, a methacrylic acid ester or an acrylic acid ester alone or copolymerizing two or more of them. Further, as the polycondensation type polymer, a polyester, a polyurea, a polyurethane or a melamine, may, for example, be mentioned. By the presence of fine polymer particles in the polyol, the hydroxyl value of the polyol can be controlled to be low, and such is effective for improvement of the physical properties such as hardness and air permeability of the flexible foam. Further, the content of the fine polymer particles in the polymer-dispersed polyol is not particularly limited, but it is preferably at most 50 mass %, more preferably from 3 to 35 mass %. Here, the various properties (such as the unsaturated value and the hydroxyl value) as a polyol, of the polymer-dispersed polyol, are considered with respect to the base polyol excluding the fine polymer particles.

The flexible foam of the present invention is produced by reacting the above-described polyol with a polyisocyanate compound in the presence of a catalyst for urethane-forming reaction, a blowing agent and a foam stabilizer.

The polyisocyanate compound to be used in the present invention is not particularly limited, and it may for example, be a polyisocyanate of e.g. an aromatic type, an alicyclic type or an aliphatic type having at least two isocyanate groups; a mixture of at least two types of such polyisocyanates; or modified polyisocyanates obtained by modifying them. As a specific example, a polyisocyanate such as tolylene diisocyanate (TDI), diphenylmethane diisocyanate (MDI or monomellic MDI), polymethylenepolyphenyl polyisocyanate (so-called crude MDI), xylylene diisocyanate (XDI), isophorone diisocyanate (IPDI) or hexamethylene diisocyanate (HMDI), or a prepolymer type modified product, a isocyanurate modified product, a urea-modified product or a carbodiimide modified product thereof, may be mentioned. Among them, TDI, MDI, crude MDI or a modified product thereof is preferred. Further, among them, it is particularly preferred to employ crude MDI or its modified product (particularly preferably a prepolymer type modified product), since the foam stability will be improved, and the durability will be improved.

The amount of the polyisocyanate compound to be used, is usually represented by an isocyanate index (a numerical value represented by 100 times of the number of isocyanate groups to the total number of all active hydrogen of the polyol, the crosslinking agent, water, etc.), and the amount of the polyisocyanate compound to be used in the present invention is preferably within a range of from 40 to 120, more preferably within a range of from 50 to 110, by the isocyanate index.

As the urethane-forming catalyst for reacting the above polyol with the polyisocyanate compound, any catalyst which promotes a urethane-forming reaction may be employed. For example, a tertiary amine such as triethylenediamine, bis(2-dimethylaminoethyl)ether or N,N,N',N'-tetramethylhexamethylenediamine; a metal salt of a carboxylic acid such as potassium acetate or potassium 2-ethylhexanoate; or an organic metal compound such as stannous octoate or dibutyltin dilaurate, may be mentioned.

Further, the above blowing agent is not particularly limited, but at least one member selected from the group consisting of water and inert gases is preferred. Inert gases may specifically be air, nitrogen and carbon dioxide gas. Among them, water is preferred. The amount of the blowing agent to be used, is not particularly limited. However, when water is used, it is preferably at most 10 parts by mass, more preferably from 0.1 to 8 parts by mass, per 100 parts by mass of the polyol.

The foam stabilizer to be used in the present invention may be one which is commonly used for the production of a polyurethane foam. For example, a silicone type foam stabilizer or a fluorine type foam stabilizer may be mentioned. Among them, a silicone type foam stabilizer is preferred. Here, the silicone type foam stabilizer is a compound having a polysiloxane chain and a polyoxyalkylene chain. This polysiloxane chain means an organopolysiloxane chain having an organic group in its side chain, and as an example, a dimethylsiloxane chain may be mentioned. Further, the polyoxyalkylene chain means a portion having the same alkylene oxide as mentioned above, added. The addition of an alkylene oxide may be a block addition having a single alkylene oxide added, or a random addition having two or more alkylene oxides randomly added, or these additions may be present as mixed. The structure for such a foam stabilizer may be a blocked structure of polysiloxane chains and polyoxyalkylene chains, or a structure having a polyoxyalkylene chain grafted as a side chain to the main chain of a polysiloxane chain. The structure having a polyoxyalkylene chain grafted as a side chain to the main chain of a polysiloxane chain, is preferred, since the moldability of the flexible foam will be good.

As a foam stabilizer to be used in the present invention, a silicone type foam stabilizer as defined hereinafter, is most preferred. The silicone content of this foam stabilizer is preferably from 10 to 50 mass %, more preferably from 30 to 50 mass %. Here, the silicone content is the proportion of the polysiloxane chains in the foam stabilizer, and the rest being polyoxyalkylene chains. Further, as the content of ethylene oxide of this foam stabilizer, the content of oxyethylene groups in the above polyoxyalkylene chain, is preferably from 70 to 100 mass %, more preferably from 90 to 100 mass %. Further, the chain length (corresponding to the molecular weight) of the above polyoxyalkylene chain is preferably at most 1,000, more preferably at most 500.

Further, the above polyoxyalkylene chain preferably has hydroxyl groups at the terminals. However, it is not necessary that all terminals are hydroxyl groups, and those having hydrogen atoms of the hydroxyl groups substituted by monovalent organic groups, may be contained. The proportion of hydroxyl groups among the terminals is such that the proportion of hydroxyl groups among all terminals of the polyoxyalkylene chains, is from 50 to 100 mol %, more preferably from 70 to 100 mol %, particularly preferably 100 mol %, i.e. all terminals are hydroxyl groups. The above-mentioned monovalent organic group may be an alkyl group such as a methyl group, an ethyl group or an isopropyl group; an aryl group such as a phenyl group; or an acyl group such as an acetyl group. Among them, an organic group having a carbon number of from 1 to 6 is preferred.

In the process for producing a flexible foam of the present invention, two or more such foam stabilizers may be used in combination, or a foam stabilizer other than the above-mentioned specific foam stabilizer may be used in combination. In the production of a flexible foam of the present invention, the amount of the foam stabilizer to be used, is preferably from 0.01 to 5 parts by mass, more preferably from 0.1 to 2 parts by mass, per 100 parts by mass of the polyol (excluding a crosslinking agent).

In the present invention, a crosslinking agent or the like may be used as the case requires.

As such a crosslinking agent, a compound having at least two functional groups having active hydrogen, such as hydroxyl groups, primary amino groups or secondary amino groups may be mentioned. Further, the molecular weight of the crosslinking agent is preferably at most 10,000. Two or more crosslinking agents may be used in combination. Specific examples include compounds such as ethylene glycol, propylene glycol, 1,4-butanediol, neopentyl glycol, 1,6-hexanediol, diethylene glycol, triethylene glycol, dipropylene glycol, glycerol, trimethylolpropane, pentaerythritol, diglycerol, dextrose, sorbitol, sucrose, monoethanolamine, diethanolamine, triethanolamine, bisphenol A, diethylenediamine, 3,5-diethyl-2,4(or 2,6)-diaminotoluene (DETDA), 2-chloro-p-phenylenediamine (CPA), 3,5-bis(methylthio)-2,4(or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane and isophoronediamine, and compounds obtainable by adding an alkylene oxide thereto.

In a case where the above-mentioned crosslinking agent is used, even if it is intended to produce a low density flexible foam, for example, by using a large amount of a blowing agent, the foam stability will be good, and a flexible foam can be produced. Especially when a polyol having a high molecular weight is used, a low density flexible foam can be produced, which used to be hardly foamed. Further, as compared with a case where no crosslinking agent is used, the durability will be improved when such a crosslinking agent is used. In a case where a polyol having a high molecular weight is used as in the present invention, the foam stability can easily be improved when a compound having a relatively high molecular weight, e.g. a molecular weight of at least 4,000, is used.

In the method for producing the flexible foam of the present invention, optional additives may be used in addition to the above-described catalyst, blowing agent, foam stabilizer and crosslinking agent. As such additives, a filler such as potassium carbonate or barium sulfate; a surfactant such as a foam-stabilizing agent; an aging-preventive agent such as antioxidant or ultraviolet absorber; a flame retardant, a plasticizer, a coloring agent, an antifungal agent, a cell opener, a dispersant and a discoloration-preventive agent, may, for example, be mentioned.

The flexible foam of the present invention may be formed into a prescribed shape by a foaming method such as slab foaming.

The production of the polyurethane can be carried out by a usual method. Namely, it can be carried out by a conventional method such as a one shot method, a semi prepolymer method or a prepolymer method. For the production of the polyurethane, an apparatus which is commonly used, may be employed.

The flexible foam of the present invention is useful for e.g. bedding, mats, mattress, cushions or seat cushions.

Now, the present invention will be described in further detail with reference to Examples. However, it should be understood that the present invention is by no means restricted thereto. In the following Examples 1 to 16, the numerical values in the foaming formulations represent parts by mass. Examples 1 to 10 are Working Examples of the present invention, and Examples 11 to 16 are Comparative Examples.

Polyols used in the following Examples 1 to 16 were prepared by the following methods. Further, the measurement of the unsaturation value was carried out by a method in accordance with JIS K-1557. The DMC-glyme complex catalyst used in the following production of polyol A represents a zinc hexacyanocobaltate/ethylene glycol dimethyl ether complex catalyst, and the KOH catalyst used in the production of polyols C and D, represents a potassium hydroxide catalyst. Further, initiator 1 is a compound having a hydroxyl value of 56 mgKOH/g having propylene oxide added to glycerol, and initiator 2 is a compound having a hydroxyl value of 168 mgKOH/g having propylene oxide added to glycerol.

Production of Polyol A

In the presence of 3,000 g of initiator 1, using the DMC-glyme complex catalyst, 21,700 g of propylene oxide was reacted at about 120° C., and then, using the KOH catalyst. 1,300 g of ethylene oxide was reacted at about 120° C. to complete the polymerization. After the reaction, treatment with an adsorbent (synthetic magnesium silicate) and Filtration were carried out to obtain polyoxyalkylene polyol A having a hydroxyl value of 9.14 mgKOH/g and an unsaturation value of 0.038 meq/g.

Production of Polyol C

In the presence of 1,000 g of initiator 2, using the KOH catalyst, 4,250 g of propylene oxide was reacted at about 110° C., and then, 800 g of ethylene oxide was reacted at about 120° C. to complete the polymerization. After the reaction, treatment with an adsorbent (synthetic magnesium silicate) and filtration were carried out to obtain polyoxyalkylene polyol C having a hydroxyl value of 34.0 mgKOH/g and an unsaturation value of 0.056 meq/g.

Production of Polyol D

In the presence of 1,000 g of initiator 2, using the KOH catalyst, 2,200 g of a mixture of ethylene oxide and propylene oxide containing 10 mass % of ethylene oxide, was reacted at about 110° C. to complete the production. After the reaction, treatment with an adsorbent (synthetic magnesium silicate) and filtration were carried out to obtain polyol D having a hydroxyl value of 56.1 mgKOH/g and an unsaturation value of 0.045 meq/g.

Using the raw materials and blending amounts (numerals represent parts by mass) as shown in Tables 1 to 4, flexible foams were produced. In Examples 1 to 10, among these raw materials and blend agents, the liquid temperature of a mixture of all raw materials other than the polyisocyanate was adjusted to 50° C.±1° C., the liquid temperature of the polyisocyanate compound solution was adjusted to 20±1° C., a predetermined amount of the polyisocyanate compound was added to the polyol-containing mixture, and the entire amount of 1 kg was mixed by a high speed mixer for 5 seconds and then injected into a wood box having a size of 300×300 mm and a height of 300 mm with the top being open, at room temperature. The polyurethane foam was taken out and left to stand for at least 24 hours, whereupon various physical properties were measured.

With respect to Examples 11 to 16, polyurethane foams were produced in the same manner as in Examples 1 to 10 except that a mixture of all raw materials other than the polyisocyanate and a polyisocyanate compound solution were, respectively, adjusted to 25° C.±1° C.

The results of the measurements are shown in Tables 2 to 4. The physical properties of the foams were measured in accordance with the following standards, and with respect to the density, a sample cut out from the mol % of a foam in a size of 100×100 mm and a height of 50 mm except for the end portions, was used for the measurement. Further, the unsaturation value in Tables 2 to 4 represents the total unsaturation value of the polyol and the base polyol in the polymer-dispersed polyol, and the unit is meq/g.

Now, the standards used for the measurements of the physical properties of the flexible foams will be shown below.

The core density (unit: kg/m$^3$), the 25% hardness (ILD) (unit: N/314 cm$^2$), the CLD hardness (unit: N/cm$^2$), the core impact resilience (unit: %), the tear strength (unit: N/cm), the tensile strength (unit: kPa), the elongation (unit: %), the dry heat compression set (unit: %) and the air permeability (unit: ft$^3$/min (SI conversion: 28.3 L/min)) were measured by methods in accordance with JIS K-6400. Further, the stability (the settling rate) of a foam was calculated based on the following formula and evaluated under the standards such that a settling rate of at least 0% and less than 20%: ○ good, a settling rate of at least 20 and less than 40%: Δ fair, and a settling rate of at least 40%: × poor.

Settling rate=((maximum foam height−final foam height)/(maximum foam height)×100

Further, the closed-cell property (crushing property) was evaluated under the standards such that no shrinkage after foamed: ○, shrinkage after foamed but the shape returned to the initial state after crushing a few times: Δ, shrinkage after foamed was observed, and the shape did not return to the initial state after crushing a few times: ×.

Synthesis of Polyisocyanate d3

Into a 1 l three-necked flask, in a nitrogen atmosphere, 1,000 g of crude MDI (tradename: MILLIONATE MR200, manufactured by Nippon Polyurethane Industry Co., Ltd., isocyanate group content: 31.0%) was charged, and then, 36.1 g of polyethylene glycol monomethyl ether (tradename: MPG-081, manufactured by Nippon Nyukazai Co., Ltd., hydroxyl value: 84.0 mgKOH/g) was continuously dropwise added with stirring and reacted for 3 hours at a temperature of 70° C. to obtain an isocyanate group terminal prepolymer. The isocyanate group content of this prepolymer was 29.5 mass %.

TABLE 1

| | |
|---|---|
| Crosslinking agent a1 | A polyol having propylene oxide and ethylene oxide sequentially added to sorbitol and having an oxyethylene group content of 5 mass % and a hydroxyl value of 56 mgKOH/g |
| Catalyst b1 | A dipropylene glycol (DPG) solution of triethylenediamine (tradename: TEDA L-33, manufactured by TOSOH CORPORATION) |
| Foam stabilizer c1 | Silicone type foam stabilizer (tradename: L-580, manufactured by Nippon Unicar Co., Ltd.) |
| Foam stabilizer c2 | Silicone type foam stabilizer (tradename: L-5421, manufactured by Nippon Unicar Co., Ltd.) |
| Foam stabilizer c3 | Silicone type foam stabilizer (tradename: L-5309, manufactured by Nippon Unicar Co., Ltd.) |
| Foam stabilizer c4 | Silicone type foam stabilizer (tradename: SRX 274C, manufactured by Toray Dow Corning Co., Ltd.) |
| Blowing agent | Water |
| Polyol R | A polymer-dispersed polyol having acrylonitrile/styrene copolymer particles (41.5 mass %) dispersed in polyol D (58.5 mass %) as the dispersant. |
| Polyisocyanate d1 | TDI (tradename: Coronate T-80, manufactured by Nippon Polyurethane Industry Co., Ltd.) |
| Polyisocyanate d2 | MR200 |
| Polyisocyanate d3 | MR200/MPG081 prepolymer (NCO = 29.5 mass %) |
| Polyisocyanate d4 | A mixture of MR200/monomellic MDI = 40/60, NCO = 32.3% |

TABLE 2

| Examples | 1 | 2 | 3 | 4 | 5 | 6 |
|---|---|---|---|---|---|---|
| Polyol | A:100 | A:100 | A:100 | A:100 | A:100 | A:90 R:10 |
| Total unsaturation value (meq/g) | 0.038 | 0.038 | 0.038 | 0.038 | 0.038 | 0.037 |
| Crosslinking agent a1 | 10 | — | — | — | — | — |
| Catalyst b1 | 1 | 1 | 1 | 1 | 1 | 1 |
| Foam stabilizer c1 | — | — | — | — | 1 | 1 |
| Foam stabilizer c2 | 1 | 1 | 1 | 1 | — | — |
| Foam stabilizer c3 | — | 0.5 | 0.5 | 0.5 | — | — |
| Blowing agent | 3 | 1.5 | 2.5 | 3.5 | 1.8 | 1.8 |
| Polyisocyanate d1 | 28.2 | 14.4 | 23.1 | 31.8 | 17.0 | 17.4 |
| Isocyanate index | 90 | 90 | 90 | 90 | 90 | 90 |
| Foam stability | ○ | ○ | ○ | ○ | ○ | ○ |
| Closed-cell property | ○ | ○ | ○ | ○ | ○ | ○ |
| Core density (kg/m$^3$) | 40.7 | 70.5 | 42.5 | 35.7 | 60.0 | 62.6 |
| 25% hardness (N/314 cm$^2$) | 107 | 113 | 99 | 80 | 125 | 135 |
| CLD hardness (−25° C.) (N/cm$^2$) | 0.310 | 0.274 | 0.225 | 0.186 | 0.372 | 0.412 |
| CLD hardness (23° C.) (N/cm$^2$) | 0.270 | 0.265 | 0.225 | 0.186 | 0.372 | 0.392 |
| −25° C./23° C. hardness ratio | 1.15 | 1.03 | 1.00 | 1.00 | 1.00 | 1.05 |
| Air permeability (ft$^3$/min) | 0.00 | 0.02 | 0.02 | 0.01 | 0.01 | 0.01 |
| Core impact resilience (%) | 30 | 40 | 28 | 33 | 46 | 50 |
| Tear strength (N/cm) | 3.1 | 7.0 | 7.3 | 7.4 | 9.4 | 10.6 |
| Tensile strength (kPa) | 98 | 107 | 110 | 123 | 90 | 130 |
| Elongation (%) | 230 | 320 | 300 | 290 | 340 | 430 |
| Dry heat set (%) | 6.7 | 3.2 | 5.2 | 6.6 | 6.3 | 6.9 |

TABLE 3

| Examples | 7 | 8 | 9 | 10 |
|---|---|---|---|---|
| Polyol | A:100 | A:100 | A:100 | A:100 |
| Total unsaturation value (meq/g) | 0.038 | 0.038 | 0.038 | 0.038 |
| Crosslinking agent a1 | 10 | — | 10 | — |
| Catalyst b1 | 1 | 1 | 1 | 1 |
| Foam stabilizer c1 | — | — | — | — |
| Foam stabilizer c2 | 1 | 1 | 1 | 1 |
| Foam stabilizer c3 | — | — | — | — |
| Blowing agent | 5 | 4 | 4 | 4 |
| Polyisocyanate d2 | 71.0 | — | — | — |
| Polyisocyanate d3 | — | 59.1 | 65.1 | — |
| Polyisocyanate d4 | — | — | — | 54.1 |
| Isocyanate index | 90 | 90 | 90 | 90 |
| Foam stability | ○ | ○ | ○ | ○ |
| Closed-cell property | ○ | ○ | ○ | ○ |
| Core density (kg/m$^3$) | 44.5 | 47.7 | 48.5 | 33.0 |
| 25% hardness (N/314 cm$^2$) | 169 | 87 | 89 | 214 |
| CLD hardness (−25° C.) (N/cm$^2$) | 0.323 | 0.186 | 0.195 | 0.608 |
| CLD hardness (23° C.) (N/cm$^2$) | 0.294 | 0.186 | 0.195 | 0.510 |
| −25° C./23° C. hardness ratio | 1.10 | 1.00 | 1.00 | 1.19 |
| Air permeability (ft$^3$/min) | 0.02 | 0.08 | 0.08 | 0.02 |
| Core impact resilience (%) | 32 | 34 | 35 | 31 |
| Tear strength (N/cm) | 4.0 | 2.5 | 2.8 | 6.8 |
| Tensile strength (kPa) | 82 | 50 | 48 | 125 |
| Elongation (%) | 50 | 70 | 67 | 105 |
| Dry heat compression set (%) | 2.6 | 1.7 | 1.4 | 6.6 |

TABLE 4

| Examples | 11 | 12 | 13 | 14 | 15 | 16 |
|---|---|---|---|---|---|---|
| Polyol | D:100 | D:100 | D:100 | D:100 | C:100 | D:100 |
| Total unsaturation value (meq/g) | 0.045 | 0.045 | 0.045 | 0.045 | 0.056 | 0.045 |

TABLE 4-continued

| Examples | 11 | 12 | 13 | 14 | 15 | 16 |
|---|---|---|---|---|---|---|
| Crosslinking agent a1 | 10 | — | 10 | — | — | — |
| Catalyst b1 | 1 | 1 | 1 | 1 | 1 | 1 |
| Foam stabilizer c1 | — | 1 | — | — | — | — |
| Foam stabilizer c2 | 1 | — | 1 | 1 | — | 1 |
| Foam stabilizer c4 | — | — | — | — | 1 | — |
| Blowing agent | 3 | 1.8 | 5 | 4 | 4 | 4 |
| Polyisocyanate d1 | 34.8 | 23.5 | — | — | — | — |
| Polyisocyanate d2 | — | — | 81.2 | — | — | — |
| Polyisocyanate d3 | — | — | — | 69.8 | 64.6 | — |
| Polyisocyanate d4 | — | — | — | — | — | 63.9 |
| Isocyanate index | 90 | 90 | 90 | 90 | 90 | 90 |
| Foam stability | ○ | ○ | ○ | ○ | ○ | ○ |
| Closed-cell property | ○ | Δ | ○ | ○ | ○ | ○ |
| Core density (kg/m$^3$) | 40.4 | 54.5 | 40.5 | 50.9 | 34.2 | 37.9 |
| 25% hardness (N/314 cm$^2$) | 74 | 49 | 232 | 171 | 112 | 206 |
| CLD hardness (−25° C.) (N/cm$^2$) | 0.255 | 0.157 | 1.000 | 0.519 | 0.343 | 0.676 |
| CLD hardness (23° C.) (N/cm$^2$) | 0.196 | 0.137 | 0.588 | 0.304 | 0.235 | 0.451 |
| −25° C./23° C. hardness ratio | 1.30 | 1.14 | 1.70 | 1.71 | 1.46 | 1.50 |
| Air permeability (ft$^3$/min) | 0.044 | 0.07 | 0.017 | 0.02 | 1.41 | 0.05 |
| Core impact resilience (%) | 25 | 13 | 26 | 26 | 42 | 29 |
| Tear strength (N/cm) | 2.9 | 4.2 | 1.9 | 1.8 | 2.5 | 4.5 |
| Tensile strength (kPa) | 35 | 36 | 49 | 35 | 50 | 63 |
| Elongation (%) | 105 | 170 | 30 | 30 | 50 | 50 |
| Dry heat compression set (%) | 25.7 | 12.2 | 14.9 | 13.0 | 11.8 | 11.5 |

From the results shown in Tables 2 to 4, it is evident that the flexible foams of Examples 1 to 10 produced by using a polyol having a hydroxyl value of at most 15 mgKOH/g, have superior mechanical properties as compared with the flexible foams of Examples 11 to 16 produced by using a polyol having a hydroxyl value higher than that. The average hydroxyl value of the polyol mixture in Example 6 is 12.0 mgKOH/g.

Examples and Comparative Examples can be compared as divided into a case where TDI was used as the isocyanate (Examples 1 to 6, 11 and 12) and a case where MDI (inclusive of a case where it is converted to a prepolymer) was used (Examples 7 to 10 and 13 to 16). Namely, in the case where MDI was used, with respect to the dry heat compression set (the smaller the better) as an index for the durability, Examples show values smaller than 7% and preferred as compared with Comparative Examples. Further, as the mechanical properties, three properties of tear strength, tensile strength and elongation (in each case, the larger, the better) can be compared, and with respect to each of them, Examples show values equal or superior to Comparative Examples. On the other hand, in the case where TDI was used, the dry heat compression set was smaller than 7%, which is a value preferred as compared with Comparative Examples. Further, with respect to the mechanical properties, particularly with respect to the tensile strength and the elongation, Examples show values superior to Comparative Examples.

Further, it has been found that by using MDI converted to a prepolymer, even when a polyol having a low hydroxyl value, which used to be considered hardly useful for the production, is used, it is possible to obtain a flexible foam having good stability of the foam (especially stable even among Examples), and showing excellent durability.

Further, the flexible foams of Examples 1 to 10 have a characteristic such that the change in the physical properties due to the temperature change (the −25° C./23° C. hardness ratio) is small (ideally, there is no change, and the above hardness ratio is 1).

As described in the foregoing, according to the method for producing a flexible foam of the present invention, a flexible polyurethane foam excellent in mechanical properties can be produced. Further, the flexible polyurethane foam of the present invention has a characteristic such that the change in the physical properties due to the temperature change is small.

The entire disclosure of Japanese Patent Application No. 2001-367186 filed on Nov. 30, 2001 including specification, claims and summary is incorporated herein by reference in its entirety.

What is claimed is:

1. A method comprising
reacting a polyol in an open mold with a polyisocyanate compound in the presence of a catalyst, a blowing agent and a foam stabilizer, wherein the polyol has a hydroxyl value of at most 15 mgKOH/g, to form a flexible polyurethane foam having a core impact resiliency of 30 to 46%.

2. The method according to claim 1, wherein the polyol has an unsaturation value of at most 0.05 meq/g.

3. The method according to claim 1, wherein the polyol is produced in the presence of a double metal cyanide complex catalyst.

4. The method according to claim 1, wherein the polyol comprises fine polymer particles.

5. The method according to claim 1, wherein the foam stabilizer is a silicone foam stabilizer having a silicone content of from 10 to 50 mass %.

6. The method according to claim 1, wherein the polyisocyanate compound is at least one member selected from the group consisting of tolylene diisocyanate, diphenylmethane diisocyanate, polymethylenepolyphenyl polyisocyanate, a tolylene diisocyanate modified product, a diphenylmethane diisocyanate modified product, and a polymethylenepolyphenyl polyisocyanate modified product.

7. The method according to claim 1, wherein the polyisocyanate compound is at least one selected from the group consisting of polymethylenepolyphenyl polyisocyanate and a polymethylenepolyphenyl polyisocyanate modified product.

8. The method according to claim 1, wherein the polyol has a hydroxyl value of less than 10 mgKOH/g.

9. The method according to claim 8, wherein the polyol has an unsaturation value of at most 0.05 meq/g.

10. The method according to claim 8, wherein the polyol is produced in the presence of a double metal cyanide complex catalyst.

11. The method according to claim 8, wherein the polyol comprises fine polymer particles.

12. The method according to claim 8, wherein the foam stabilizer is a silicone foam stabilizer having a silicone content of from 10 to 50 mass %.

13. The method according to claim 8, wherein the polyisocyanate compound is at least one member selected from the group consisting of tolylene diisocyanate, diphenylmethane diisocyanate, polymethylenepolyphenyl polyisocyanate, a tolylene diisocyanate modified product, a diphenylmethane diisocyanate modified product, and a polymethylenepolyphenyl polyisocyanate modified product.

14. The method according to claim 8, wherein the polyisocyanate compound is at least one selected from the group consisting of polymethylenepolyphenyl polyisocyanate and a polymethylenepolyphenyl polyisocyanate modified product.

15. A flexible polyurethane foam obtained by the process as claimed in claim 1.

16. The flexible polyurethane foam according to claim 15, wherein the polyol has a hydroxyl value of less than 10 mgKOH/g.

17. The flexible polyurethane foam according to claim 15, wherein the polyol is produced in the presence of a double metal cyanide complex catalyst.

18. The flexible polyurethane foam according to claim 15, wherein the foam stabilizer is a silicone foam stabilizer having a silicone content of from 10 to 50 mass %.

19. The flexible polyurethane foam according to claim 15, wherein as the polyisocyanate compound is at least one member selected from the group consisting of tolylene diisocyanate, diphenylmethane diisocyanate, polymethylenepolyphenyl polyisocyanate, a tolylene diisocyanate modified product, a diphenylmethane diisocyanate modified product, and a polymethylenepolyphenyl polyisocyanate modified product.

20. The flexible polyurethane foam according to claim 15, wherein as the polyisocyanate compound is at least one selected from the group consisting of polymethylenepolyphenyl polyisocyanate and a polymethylenepolyphenyl polyisocyanate modified product.

21. The method according to claim 1, wherein the air permeability of the flexible foam is from 0 to 0.08 ft$^3$/min.

22. A method comprising
reacting a polyol in an open mold with a polyisocyanate compound in the presence of a catalyst, a blowing agent and a foam stabilizer, wherein the polyol has a hydroxyl value of at most 15 mgKOH/g, to form a flexible polyurethane foam having an air permeability of from 0 to 0.08 ft$^3$/min.

23. The method according to claim 22, wherein the polyol has an unsaturation value of at most 0.05 meq/g.

24. The method according to claim 22, wherein the polyol is produced in the presence of a double metal cyanide complex catalyst.

25. The method according to claim 22, wherein the polyol comprises fine polymer particles.

26. The method according to claim 22, wherein the foam stabilizer is a silicone foam stabilizer having a silicone content of from 10 to 50 mass %.

27. The method according to claim 22, wherein the polyisocyanate compound is at least one member selected from the group consisting of tolylene diisocyanate, diphenylmethane diisocyanate, polymethylenepolyphenyl polyisocyanate, a tolylene diisocyanate modified product, a diphenylmethane diisocyanate modified product, and a polymethylenepolyphenyl polyisocyanate modified product.

28. The method according to claim 22, wherein the polyisocyanate compound is at least one selected from the group consisting of polymethylenepolyphenyl polyisocyanate and a polymethylenepolyphenyl polyisocyanate modified product.

29. The method according to claim 22, wherein the polyol has a hydroxyl value of less than 10 mgKOH/g.

30. The method according to claim 29, wherein the polyol has an unsaturation value of at most 0.05 meq/g.

31. The method according to claim 29, wherein the polyol is produced in the presence of a double metal cyanide complex catalyst.

32. The method according to claim 29, wherein the polyol comprises fine polymer particles.

33. The method according to claim 29, wherein the foam stabilizer is a silicone foam stabilizer having a silicone content of from 10 to 50 mass %.

34. The method according to claim 29, wherein the polyisocyanate compound is at least one member selected from the group consisting of tolylene diisocyanate, diphenylmethane diisocyanate, polymethylenepolyphenyl polyisocyanate, a tolylene diisocyanate modified product, a diphenylmethane diisocyanate modified product, and a polymethylenepolyphenyl polyisocyanate modified product.

35. The method according to claim 29, wherein the polyisocyanate compound is at least one selected from the group consisting of polymethylenepolyphenyl polyisocyanate and a polymethylenepolyphenyl polyisocyanate modified product.

36. A flexible polyurethane foam obtained by the process as claimed in claim 22.

37. The flexible polyurethane foam according to claim 36, wherein the polyol has a hydroxyl value of less than 10 mgKOH/g.

38. The flexible polyurethane foam according to claim 36, wherein the polyol is produced in the presence of a double metal cyanide complex catalyst.

39. The flexible polyurethane foam according to claim 36, wherein the foam stabilizer is a silicone foam stabilizer having a silicone content of from 10 to 50 mass %.

40. The flexible polyurethane foam according to claim 36, wherein as the polyisocyanate compound is at least one member selected from the group consisting of tolylene diisocyanate, diphenylmethane diisocyanate, polymethylenepolyphenyl polyisocyanate, a tolylene diisocyanate modified product, a diphenylmethane diisocyanate modified product, and a polymethylenepolyphenyl polyisocyanate modified product.

41. The flexible polyurethane foam according to claim 36, wherein as the polyisocyanate compound is at least one selected from the group consisting of polymethylenepolyphenyl polyisocyanate and a polymethylenepolyphenyl polyisocyanate modified product.

* * * * *